United States Patent [19]

Armand et al.

[11] Patent Number: 5,283,310
[45] Date of Patent: Feb. 1, 1994

[54] PROTON CONDUCTING POLYMER, AND APPLICATION THEREOF AS ELECTROLYTE IN ELECTROCHEMICAL DEVICES

[75] Inventors: Michel Armand, St Martin d'Uriage; Christiane Poinsignon, Grenoble; Jean-Yves Sanchez, St Ismier; Veronica de Zea Bermudez, Grenoble, all of France

[73] Assignee: Saint-Gobain Vitrage International, Courbevoie, France

[21] Appl. No.: 944,094

[22] Filed: Sep. 11, 1992

[30] Foreign Application Priority Data

Sep. 13, 1991 [FR] France ................. 91 11349
Apr. 28, 1992 [FR] France ................. 92 05247

[51] Int. Cl.$^5$ ................. C08G 77/26; C08G 77/78
[52] U.S. Cl. ......................... 528/30; 528/38; 556/407; 556/413; 556/421; 556/423; 556/428
[58] Field of Search ............ 528/30, 38; 556/407, 556/421, 423, 428, 413

[56] References Cited

U.S. PATENT DOCUMENTS

| 3,678,089 | 7/1972 | Berger | 556/428 |
| 3,716,517 | 2/1973 | Pittman et al. | 528/42 |
| 4,523,002 | 6/1985 | Campbell et al. | 528/26 |
| 4,923,950 | 8/1990 | Ravine et al. | 528/38 |

FOREIGN PATENT DOCUMENTS

| 0372584 | 6/1990 | European Pat. Off. |
| 0404698 | 12/1990 | European Pat. Off. |

OTHER PUBLICATIONS

Database WPIL, Derwent Publications Ltd., No. 89-251855, & JP-118325, Jul. 20, 1989, "Polyethylene Oxide-Polysiloxane Polymer—Obtd. by Reacting Oligo:Ethylene Oxide Deriv. and Metal-Contg. Silane Cpd".
Patent Abstracts of Japan, vol. 14, No. 168, (E-912), Mar. 30, 1990, & JP-2024976, Jan. 26, 1990, Akashiro Kiyoaki, et al., "Lithium Ion Conducting Polymer Electrolyte".

Primary Examiner—John C. Bleutge
Assistant Examiner—Margaret W. Glass
Attorney, Agent, or Firm—Oblon, Spivak, McClelland, Maier & Neustadt

[57] ABSTRACT

This invention has as its subject a basic organo-mineral proton conducting polymer, produced by copolymerization of three precursors:

a precursor based upon a trialkoxysilane, onto which a methane sulphonamide group is grafted by means of an alkyl or aryl link, a "deprotonizing" precursor based upon a trialkoxysilane, onto which is grafted a group derived from a nitrogenous base, preferably an imidazoline group, by means of an alkyl or aryl link, a "plasticizing" and solvating precursor, having at least one urea group which is the product of a reaction between a primary mono-, di- or triamine D and a trialkoxysilane E onto which an isocyanate group has been grafted by means of an alkyl link.

10 Claims, 7 Drawing Sheets

E

+

D

↓ THF

C

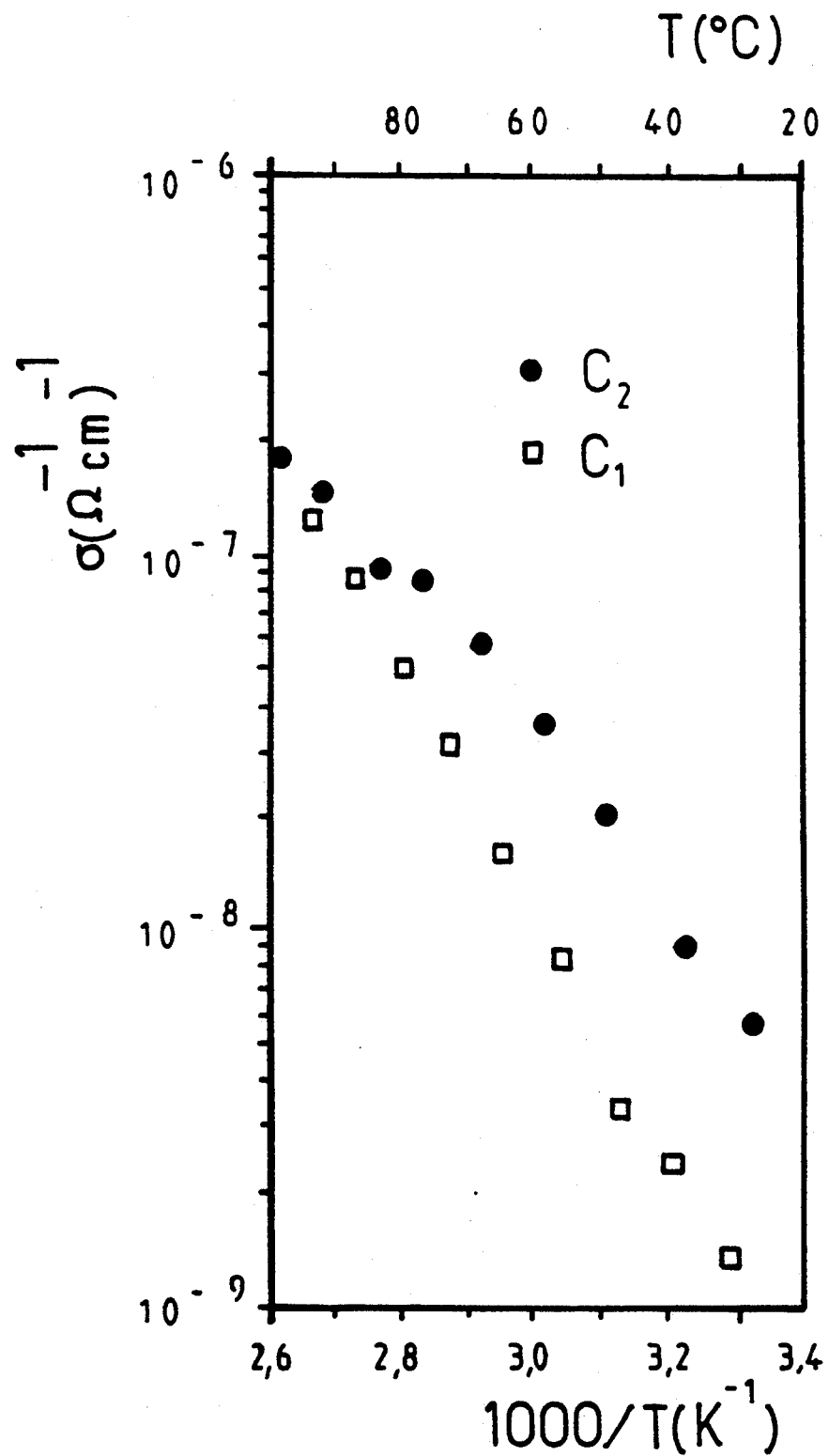
FIG_5

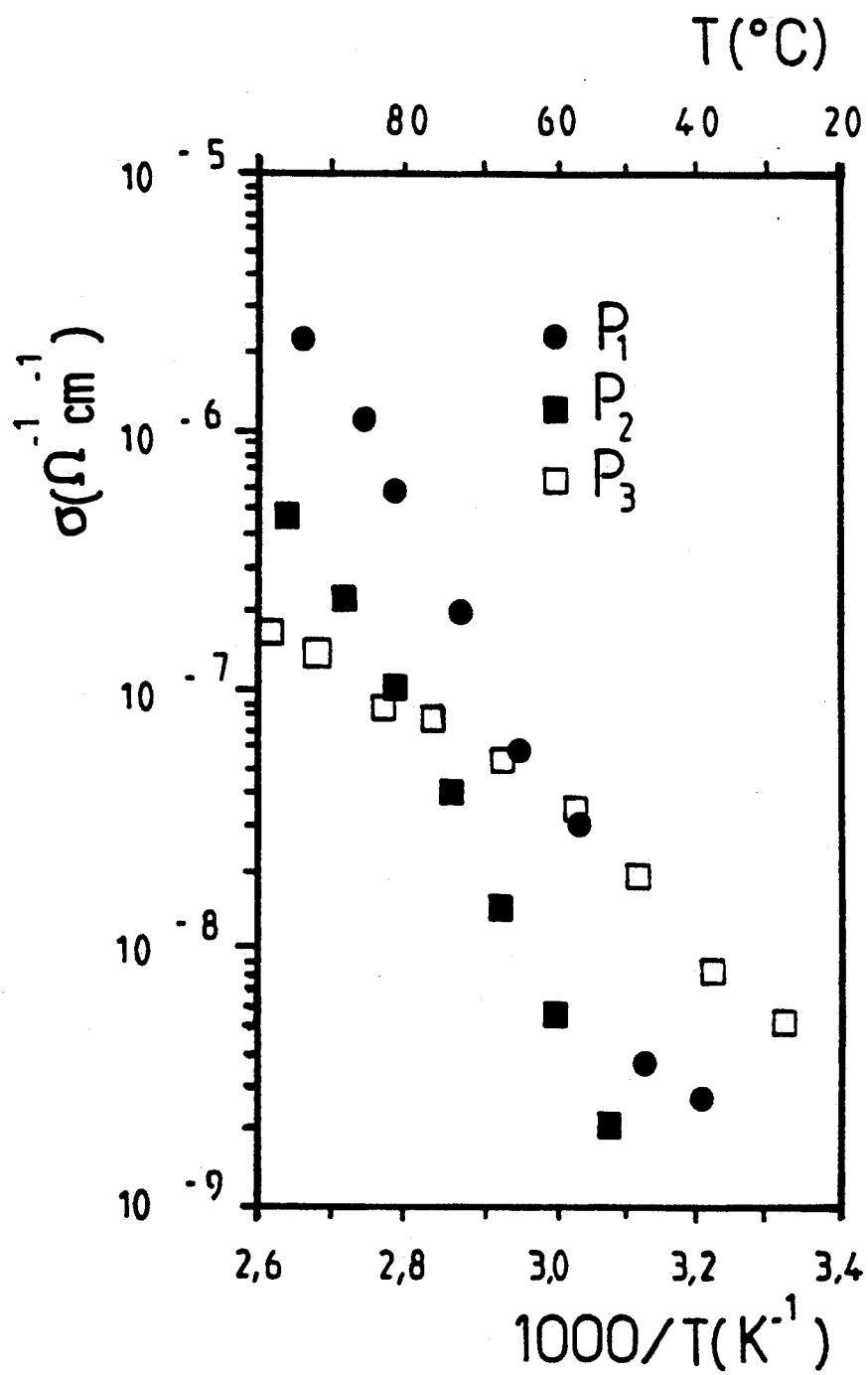
FIG_6

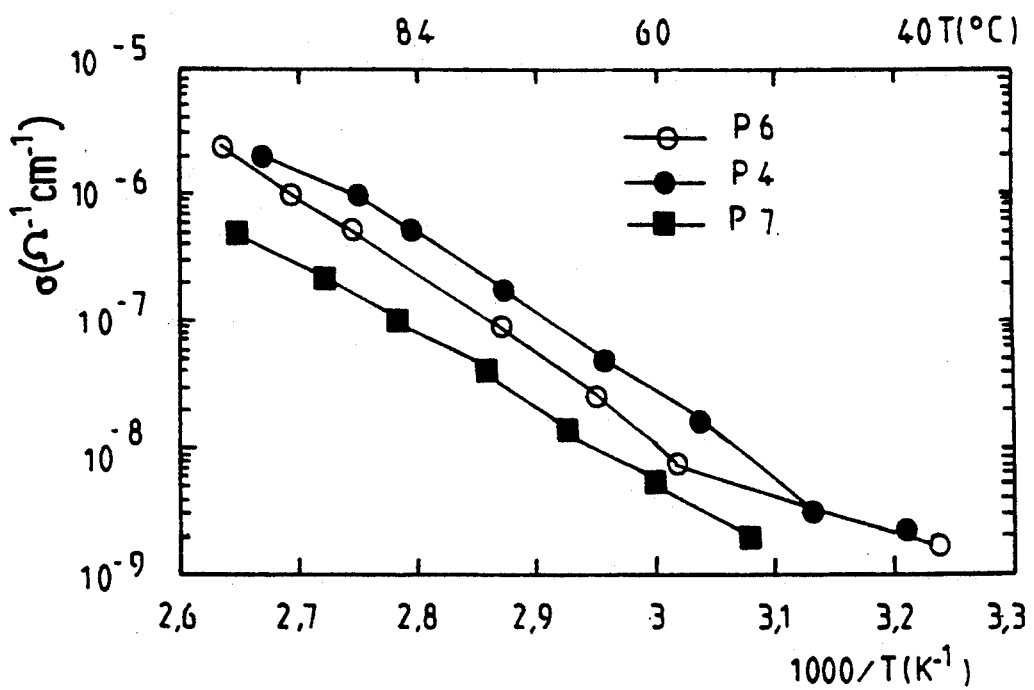
FIG_8
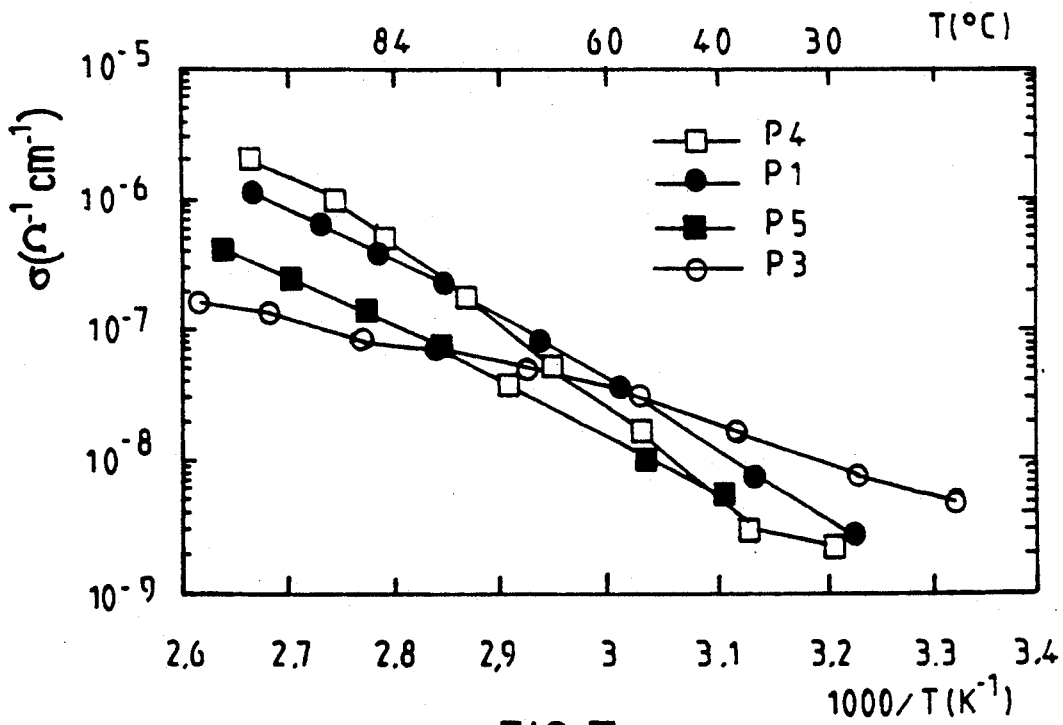
FIG_7

PROTON CONDUCTING POLYMER, AND APPLICATION THEREOF AS ELECTROLYTE IN ELECTROCHEMICAL DEVICES

BACKGROUND OF THE INVENTION

The present invention concerns proton conducting polymers and their use as electrolytes in electrochemical devices More specifically, the present invention is directed to polymers which have a proton conductivity and mechanical characteristics that allow them to be used as electrolytes in electrochromic panes; i.e., in panes in which light transmission can be modified by the action of a potential difference, thanks to the presence of a layer of electrochromic material (such as oxides and/or hydroxides of tungsten, iridium, nickel or titanium) which material has the ability to reversibly change color upon the insertion of cations and, notably, of protons.

In order for proton conducting polymers to be effective as electrolytes in electrochemical devices they must fulfill several criteria notably combining good film-forming abilities with both satisfactory compatibility and sufficient bonding with adjacent layers of an electrochromic system. Generally, both for reasons of ease of use and in order to achieve a sufficiently high conductivity, it is necessary for these polymers to be essentially amorphous, as any onset of crystallinity is very unfavorable toward the eventual conductivity of the material, and, further, it is necessary for these polymers to have an elastomeric character which favors mobility of the segments of the polymer network and, accordingly, promotes proton transfer.

DESCRIPTION OF THE PRIOR ART

It is well known that such types of proton electrolytes can be produced by dissolving strong acids such as sulphuric acid or phosphoric acid in an organic polymer matrix possessing heteroatoms. These heteroatoms may be oxygen, as in the case of polyethylene oxide (PEO), or nitrogen, as in the case of linear polyethylene imine (LPEI) or branched polyethylene imine (BPEI). The pairs of free electrons on these heteroatoms allow the protons of the strong acids to be solvated via hydrogen bonding, and the proton conductivity of these materials relies then upon the presence of an excess of protons within the polymer.

Another approach for producing such proton electrolytes consists of designing proton conducting polymers which possess a basic character. The principle relies upon creating, within the same organic polymers as previously described for solvating strong acids, proton gaps or defects, which gaps allow the transfer of protons. The basic character of the polymer is a considerable asset because these polymers offer better compatibility with the adjacent layers present in an electrochromic system, which layers are generally based upon oxides and hydroxides and correspond to the layers presenting the electrochromic properties.

V. de Zea Bermudez, M. Armand, C. Poinsignon, L. Abello, and J. Y. Sanchez have for instance studied a solid solution based upon polyethylene oxide and sulphonamide [$(PEO)_n$—$NH_2SO_2NH_2$] with, as an additive known as a "doping" or "deprotonising" agent, guanidine, introduced in the form of guanidine carbonate ("Proceedings of the 3rd International Symposium in Polymer Electrolytes", Annecy, France, June, 1991). In the absence of guanidine, the conductivity of the solid solution relies upon the autodissociation capability of the sulphonamide in accordance with the equation:

$$2 NH_2-SO_2-NH_2 \leftrightarrow NH_2-SO_2-NH_3^+ + NH_2-SO_2-NH^-$$

The conductivity increases upon the addition of guanidine, which removes supplementary protons and creates "gaps" on the sulphonamide groups constituting that way the proton conducting electrolyte. An obstacle arises, however, which is inherent in the choice of a linear PEO complex, as crystallinity, which negatively effects conductivity is present at ambient temperature in the PEO/$NH_2$—$SO_2$—$NH_2$ solutions, as demonstrated by thermal analysis. The phase diagram has enabled several crystalline phases to be characterized.

SUMMARY OF THE INVENTION

The authors of the present invention have now discovered a new type of proton conducting polymer having a basic character which overcomes the above described disadvantages and provides excellent proton conductivity.

DESCRIPTION OF THE PREFERRED EMBODIMENTS

The present invention is, therefore, a basic proton conducting copolymer which is the result of the copolymerization of at least three types of precursors A, B and C.

The first precursor, A, is based upon a trialkoxysilane, onto which has been grafted, by means of a alkyl or aryl link, a methane sulphonamide group (—NH-$SO_2CH_3$). It is believed that this precursor imparts to the final copolymer its proton conductivity.

The second precursor, B, is based upon a trialkoxysilane onto which there is grafted, by means of an alkyl or aryl link, a basic nitrogenous group such as an imidazoline, pyrrolidine, pyrrole, pyrazole, piperidine, pyridine, pyridazine, pyrimidine and pyrazine group, preferably an imidazoline group. This precursor is believed to have the function of partially "deprotonising" the methane sulphonamide groups provided by precursor A, just as any base would, in order to ensure the proton conductivity of the final basic copolymer by means of the gaps thus created.

The third precursor, C, is a "plasticizer" having a solvating property which has incorporated at least one urea functionality, and is preferably the product of the reaction between a primary mono-, di- or triamine D and a trialkoxysilane E onto which there is grafted an isocyanate group by means of an alkyl link. This precursor is believed to have the function of plasticizing the final copolymer so that the latter shall have a character which is both amorphous and plastic, an indispensable requirement for good conductivity and suitability for use as an electrolyte in an electrochromic system. Its presence makes it possible, notably, to overcome any rigidity induced by the presence of precursor B.

When precursors A, B and C are copolymerized, an organo-mineral polymer is obtained which has a silicated skeleton which is modified by different organic functional group "grafts", the silica skeleton providing both good mechanical strength and also remarkable thermal stability, while the organic "grafts" provide the elastomeric character and the required proton conductivity. The copolymer network obtained utilizes cross-linking points constituted of Si—O—Si—C bonds, which bonds allow the combination of the covalent Si—C and Si—O—Si bonds whose remarkable properties have already been largely explored in the field of silicones.

Furthermore, the basic character of this polymer, conferred in part by the presence of precursor B, allows it to be used to good advantage as an electrolyte in an electrochromic system. Indeed, since many electrochromic materials that are in direct contact with an electrolyte have ranges of pH stability, in normal operation, of between 4 and 12 (like the oxides and/or hydroxides of nickel, titanium or iridium) and since electrochromic materials are more compatible with the electrolyte if the latter has a certain basic character, the new copolymer according to the present invention opens up the field of electrochromics to new types of electrochromic systems using, e.g., oxides and hydroxides heretofore neglected.

The alkyl links of the precursors A, B and of the reagent E are preferably linear links comprising from 1 to 4 carbon atoms, more preferably 3 carbon atoms. Similarly, the trialkoxysilanes of the precursors A, B and of reagent E are advantageously triethoxysilanes or, preferably, trimethoxysilanes, the latter allowing, by their minimal stearic hindrance, a more effective copolymerization reaction.

The primary mono-, di- or triamine D can be any primary mono-, di- or triamine, and is preferably an amino derivative from polyethylene oxide or polypropylene oxide and more preferably a diamino derivative from polyethylene oxide, which is commercially available, chosen such that it complies with the following chemical formula:

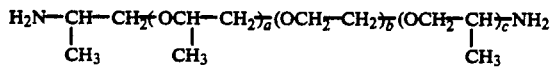

where, preferably, $a+c \geq 2.5$ with $a \geq 1$ and $c \geq 1$ and $b=8.5$, $b=15.5$ or $b=40.5$ (all the indicated values being statistical values).

The suitable proportion of "deprotonising" precursor B relative to precursor A is chosen according to the final desired degree of deprotonization. Generally, the molar percentage of B relative to A is chosen to be between 5 and 40%, preferably between 10 and 20%, and more preferably at about 15%.

Similarly, the mechanical properties of the polymer are improved by adjusting the quantity of "plasticizing" precursor C. The molar percentage of C relative to A is chosen here to be between 5 and 40%, preferably between 5 and 30%, and more preferably at approximately 10% or 20%.

One method of production of the final copolymer is via a technique commonly known as "sol-gel" polymerization, which enables a silica lattice to be organically modified under mild experimental conditions, notably at low temperature. This technique enables lattices of high purity and good homogeneity to be formed. It also has the advantage of enabling good control of the microstructural and macrostructural characteristics of the final polymer to be achieved.

BRIEF DESCRIPTION OF THE DRAWINGS

In order to indicate the scope and advantages of the present invention, the method of production and analysis and the results of different examples of certain embodiments, are described in relation with the attached figures which show.

Concerning the synthesis reaction by the "sol-gel" process, it generally consists of, first of all, a chelating step: this is the preparation of the solution of metallic or non-metallic alkoxides, $M(OR)_n$ where M=Ti, Zr, Ge, Si, etc. The alkoxides are the precursors generally used, because their chemistry is well known. As in the majority of cases they are commercially available, this step is not always necessary, which is the case within the framework of this invention, using alkoxy silicon compounds. The second step is a hydrolysis step. This involves the formation of the hydroxyalkoxides.

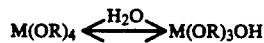

It has been shown by isotopic labelling of the oxygen from the water that it is the hydroxy group of the water which replaces the alkoxy group. The next step is the polymerization step. The first phase is a phase for elimination of alcohol:

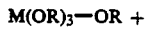

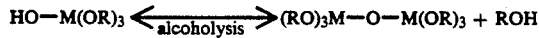

The second is a phase for elimination of water:

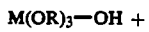

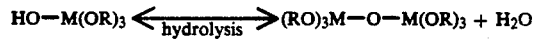

The synthesis is completed by a drying step, carried out at ambient temperature or with moderate heating, which enables the final product to be dehydrated and the solvents to be removed from it.

The macro- and microstructures, and therefore the physical properties, of the materials depend upon the experimental conditions. The important parameters which determine the speeds of hydrolysis, condensation and depolymerization, are, notably, the nature of the solvent, the temperature and the pH of the solution, the order in which the reagents are added, the rate at which the water is added, the ratio M/water, the nature of the R group (reduction of the rate of hydrolysis with increase in the length of R) and the presence of a catalyst (acid or basic).

In the present case, the reaction generally takes place in a basic medium, where the hydroxyl ion or silanoate (SiO) directly attacks the silicon. The hydrolysis reaction is rapid, the condensation reaction is slower and the polymers produced are very dense because they are branched.

The nature of the organic groups of the precursor also influence the course of the synthesis by the "sol-gel" route, notably on account of the stearic hindrance of the alkoxy groups chosen, their reactivity and the reduction in the degree of cross-linking of the mineral lattice by blocking the bonds of the silicon atom. All the starting precursors and reagents used herein are available commercially from Hals America Inc. and Petrarch Systemes Inc.

EXAMPLES

While the present invention has been described above, specific embodiments will now be presented to which the invention is in no way limited. These examples are included herein for illustration only.

A first example related to the present invention is illustrated in FIG. 1. This relates to the "sol-gel" synthesis of a methane sulphonamidosil polymer having the formula:

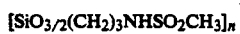

$[SiO_{3/2}(CH_2)_3NHSO_2CH_3]_n$

Figure 1A:
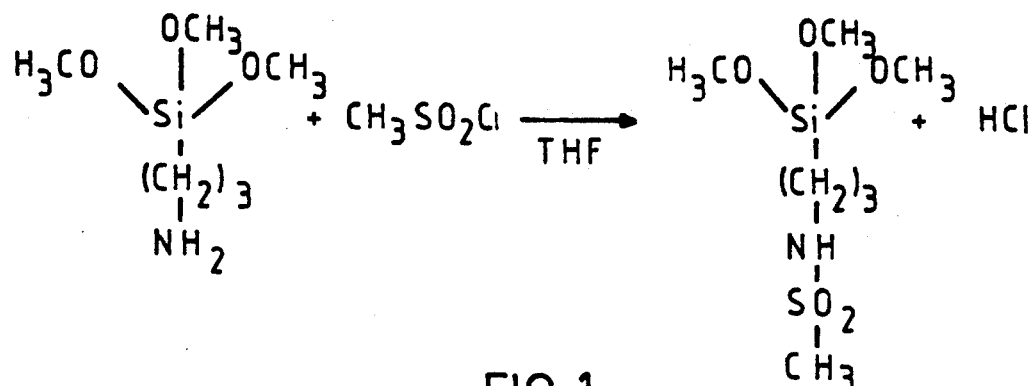
in FIG. 1(a) the synthesis reaction and in FIG. 1(b) the polymerization reaction of the precursor A, in FIG. 2: the copolymerization reaction of precursors A and B, in FIG. 3: the synthesis reaction of precursor C, in FIG. 4: the copolymerization reaction of A, B and C, in FIG. 5: a graph showing conductivity as a function of temperature for two types of polymerized precursors $C_1$ and $C_2$ described herein below, in FIGS. 6, 7 and 8: similar graphs to the one in FIG. 5 relating to the copolymerization product of A, B and $C_2$ as a function of the temperature and respective proportions of the three components.

FIG. 1a shows the first step: the synthesis of precursor A. During this step a modified alkoxide, 3-aminopropyl-trimethoxysilane, is converted into 3-methanesul-phonamidopropyltrimethoxysilane (A) by reaction with $CH_3SO_2Cl$ in THF (tetrahydrofuran) in the presence of excess (on the order of 20% in relation to the precursor) of an ion exchange resin (AMBERLYST A-21, sold commercially by the Janseen company) and in the presence of pyridine in a proportion of 20 mol % relative to the precursor. After complete reaction (approximate yield=60%), the solution is filtered and rinsed with THF.

Figure 1B:
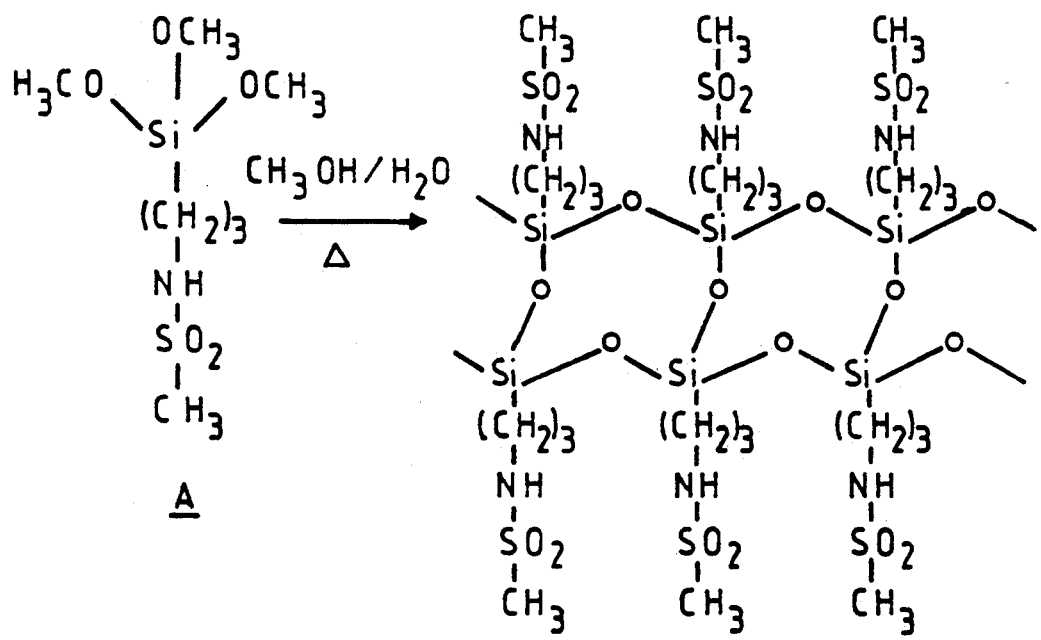

FIG. 1b shows the second step: the polymerization of A alone via the "sol-gel" process. During this second step, the hydrolysis-condensation of the precursor A takes place. The molar ratio used is 1 precursor A/4 $CH_3OH/1.5 \ H_2O$. The methanol and the water are added with stirring. Then the solution is brought to reflux for 1 hour, and finally poured into a petri dish.

The last step of drying is a thermal treatment of the product obtained at approximately 50° C. for several days, then at 80° C. for a short period. The product is finally washed with methanol several times to remove impurities from it.

The product thus obtained has a proton conductivity less than $10^{-9} \ ohm^{-1}.cm^{-1}$, a value which is clearly insufficient for it to be able to fulfil the function of an electrolyte. In addition, although amorphous, it is particularly brittle.

Figure 2:
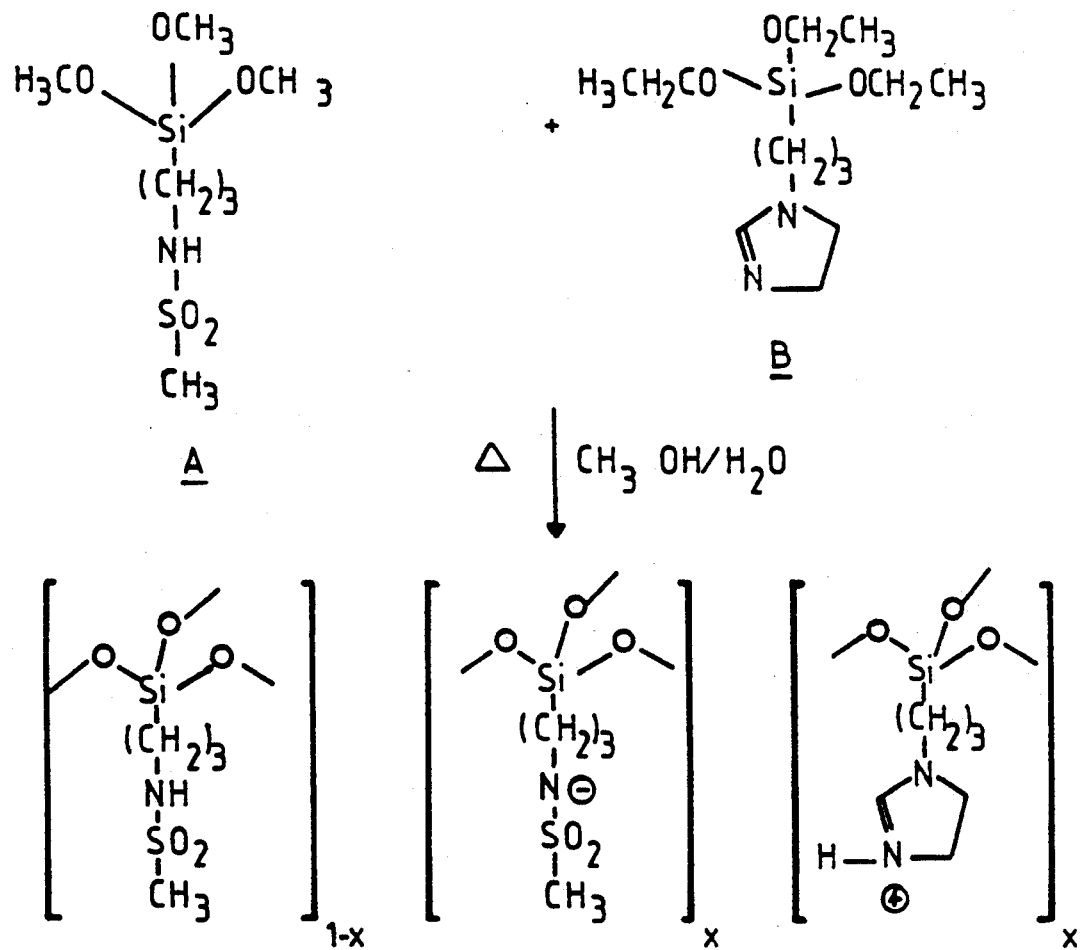

A second example related to the present invention consisted of adding precursor B to precursor A during the polymerization step. By this copolymerization, illustrated in FIG. 2, precursor B, due to its imidazoline function, will create proton gaps by removing protons from the nitrogen of the methanesulphonamide function of A. It therefore acts as a "doping agent". This compound B is 3-(2-imidazolin-1-yl) propyltriethoxysilane of the formula $(H_3CH_2CO)_3Si(CH_2)_3(N_2C_3H_5)$ and has a pKa of 13.

The sequence of addition of the reagents to A during the reaction is, firstly, methanol, then B, and lastly the water. The reaction takes place in a manner analogous to that in Example 1 and the following step of drying is identical. The final product obtained nevertheless still has a low proton conductivity and unfavorable plasticity.

In order to obtain the desired properties, a third example, which is within the scope of the present invention was conducted. This example consisted of copolymerizing simultaneously the preceding precursors A and B and a third precursor C, the purpose of which is to plasticize the final product; both to make it elastomeric for reasons of easy workability and to make the segments of the created polymer lattice more movable in order to facilitate proton transfer.

Figure 3:
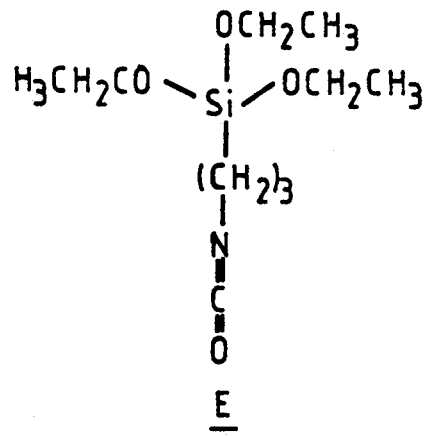
Figure 3:
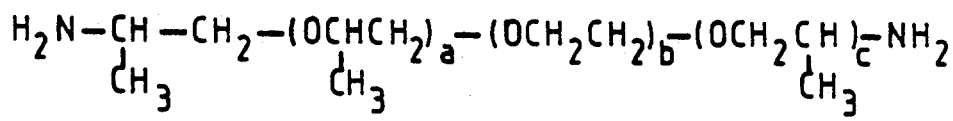
Figure 3:
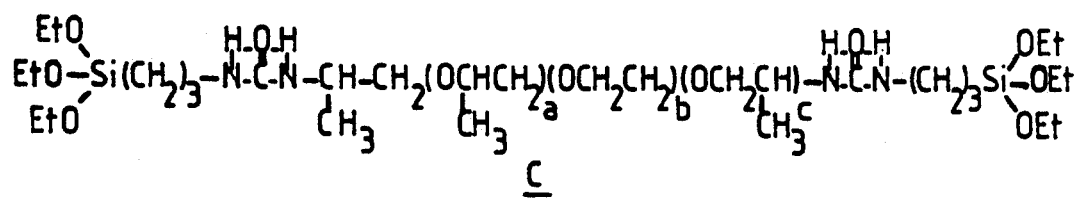

FIG. 3 illustrates the synthesis reaction of a precursor C, produced from an isocyanate E, which is 3-isocyanatopropyltriethoxysilane, and from a primary diamine D, notably where a+c=2.5 and b=8.5 (sold commercially under the trade name Jeffamine ED-646 where the number following ED designates the statistical molecular mass), or where a+c>2.5 and b=15.5 (sold under the trade name Jeffamine ED-935.5) or where a+c>2.5 and b=40.5 (sold under the trade name Jeffamine ED-2000). The synthesis of C is performed by the slow addition of the isocyanate E to the diamine D in THF medium. The precursor C is then obtained, of the type urea bridging triethoxysilane.

Figure 4:
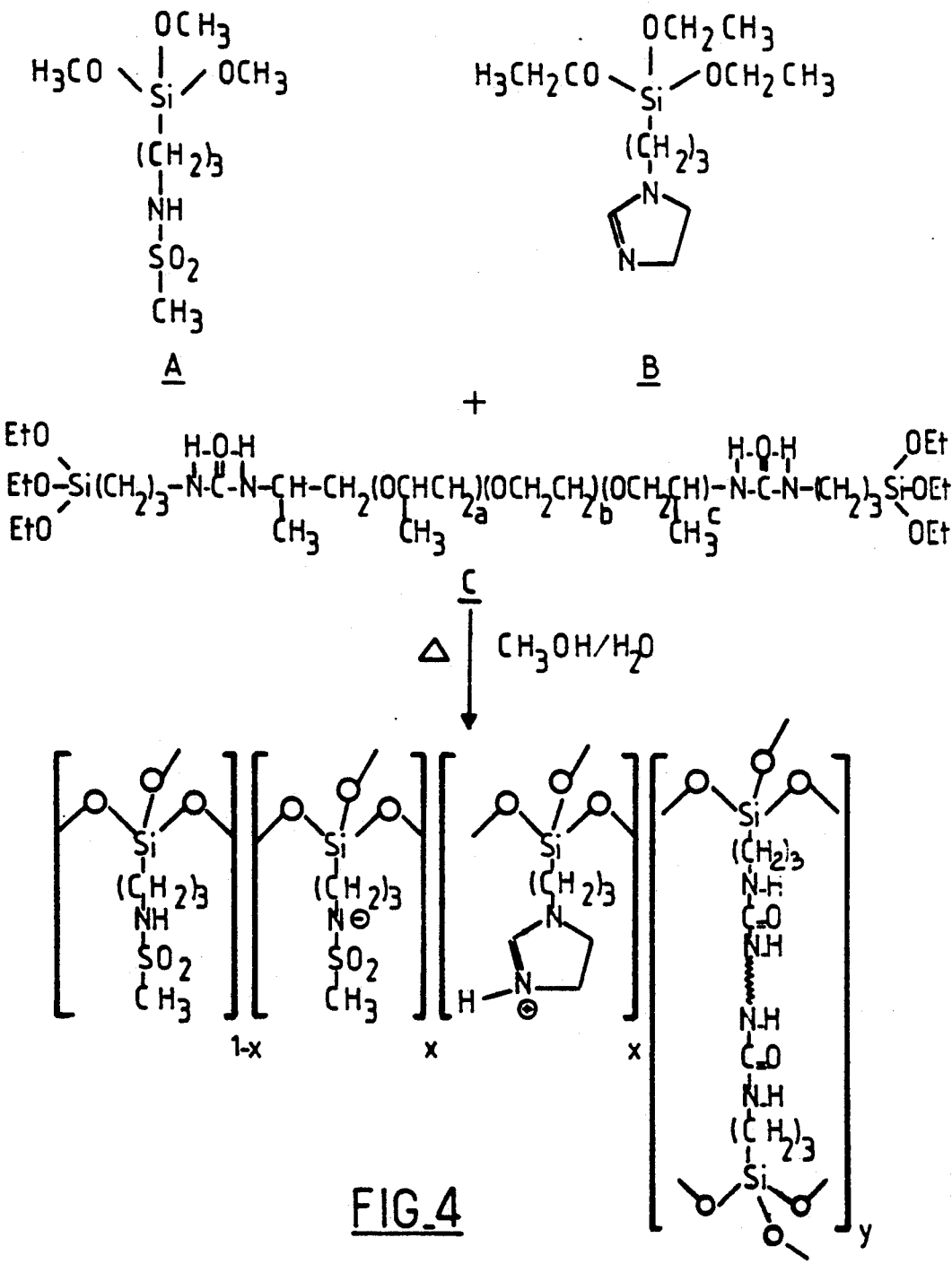

FIG. 4 illustrates the next step of copolymerization of A, B and C. The same operating conditions as described above for A and B are still used. The sequence of addition of the reagents to A is as follows: firstly the methanol, then the precursor having a plasticizing function C, then the "deprotonising" precursor B and finally the water. The product obtained is dried as before.

In FIG. 5 a graph shows the conductivity versus temperature of a polymer obtained by polymerization of the plasticizer $C_1$ only, synthesized from the Jeffamine ED-646 and the reagent E described above and also of the polymer obtained by polymerization of the plasticizer $C_2$ only, synthesized from Jeffamine ED-935.5 and the same reagent E. It can be clearly seen that the polymer from $C_2$ provides better conductivity values than the polymer starting from $C_1$.

In FIGS. 6, 7 and 8, the graphs show the development of the conductivity of the copolymers $P_{1-7}$ produced by polymerization of A, B and $C_2$ as defined above, both as a function of the temperature and also as a function of the relative proportion of the three starting components. The relative proportions are summarized in the table below, being understood that x is the molar percentage of B in relation to A and y is the molar percentage of $C_2$ in relation to A.

|       | x (%) | y (%) |
| ----- | ----- | ----- |
| $P_1$ | 15    | 20    |
| $P_2$ | 20    | 20    |
| $P_3$ | —     | 100   |
| $P_4$ | 15    | 10    |
| $P_5$ | 15    | 30    |
| $P_6$ | 10    | 10    |
| $P_7$ | 20    | 10    |

Thus, for example, copolymer $P_1$ contains 100 mol % A, 15 mol % B and 20 mol % $C_2$. Copolymer $P_3$ is the polymer obtained from plasticizer $C_2$ alone. From the Figures it will be seen that it is possible to optimize the proton conductivity of each polymer according to the invention by adjusting the factor x, which corresponds to the deprotonization percentage, and/or the factor y, which corresponds to the plasticizing percentage.

Thus, by comparing the conductivities of the products $P_4$, $P_6$ and $P_7$ (see FIG. 8) which all have the same degree of plasticizing agent $C_2$ and different deprotonization percentages x it will be seen that, in this case, it is the values of x from between 10 and 15% which lead to the highest conductivities.

Comparing the conductivities, shown in FIG. 7, of the products $P_1$, $P_4$, $P_5$, which all have the same deprotonization percentage x and different plasticizing degrees y, it is found that increasing the plasticizing degree up to 30% does not notably improve the conductivity, and in fact is rather unfavorable towards higher temperatures; the conductivities of these three products differing little around 30° C., (1,000/T (°K.)=3.30).

The specific choice of plasticizer is also of considerable importance: thus, if a polymer is synthesized according to this invention from A, B and $C_3$, where $C_3$ is Jeffamine ED-2000, already described, for a value of x of 15% and of y of 10%, a conductivity of $2 \times 10^{-7} \Omega^{-1}.cm^{-1}$ is obtained at 30° C. and a conductivity of $10^{-5} \Omega^{-1}.cm^{-1}$ is obtained at 84° C. Thus, for these given values of x and y, it is with a plasticizer having a longer chain, and therefore a higher molar mass, that the highest conductivities are obtained.

It should be noted, furthermore, that all the polymers of this invention have an amorphous and plastic character, that they are thermally stable up to 220° C. and that their range of electrochemical stability can be considered as being close to 2 V.

In conclusion, the inventors have perfected a product having good conductivity properties and satisfactory mechanical properties, which is a partially organic and partially mineral lattice, and which can be used, for example, either in electrochromic systems or in other electrochemical devices of the battery type. Its certain advantage as an amorphous electrolyte in an electrochromic system resides, notably, in the fact that its clearly basic character makes it compatible with numerous electrochromic materials.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A basic organo-mineral proton conducting polymer characterized in that it is the result of a copolymerization of at least three precursors:
   a precursor A comprising a trialkoxysilane onto which is grafted a methanesulphonamide group by means of an alkyl or aryl link,
   a deprotonizing precursor B comprising a trialkoxysilane onto which is grafted a basic nitrogenous group by means of a alkyl or aryl link, and
   a plasticizing and solvating precursor C, product of the reaction between a primary mono-, di- or triamine D and a trialkoxysilane E having an isocyanate group grafted thereon by means of a $C_1$–$C_4$-alkyl link, said precursor C having at least one urea group.

2. A polymer according to claim 1, characterized in that at least one of the said alkyl links is a linear alkyl link comprising from 1 to 4 carbon atoms.

3. A polymer according to claim 2, characterized in that at least one of the trialkoxysilane of precursors A, B or of reagent E is a trimethoxysilane or a triethoxysilane.

4. A polymer according to claim 1, characterized in that the primary amine D is a diamine which complies with the general formula:

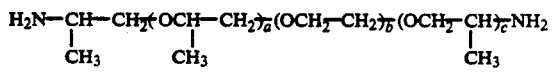

where $a+c \geq 2.5$ $a \geq 1$, $c \geq 1$, and $b=8.5$; $b=15.5$ or $b=40.5$.

5. A polymer according to claim 1, characterized in that the molar percentage of precursor B relative to precursor A is from 5 to 40%.

6. A polymer according to claim 1, characterized in that the molar percentage of precursor C relative to precursor A is from 5 to 40%.

7. A polymer according to claim 1, characterized in that it is produced by a sol-gel polymerization technique.

8. A polymer according to claim 1 wherein the basic nitrogenous group is an imidazoline group.

9. A polymer according to claim 5, wherein the molar percentage of B relative to precursor A is from 10 to 20%.

10. A polymer according to claim 6, wherein the molar percentage of C relative to precursor A is from 5 to 30%.

* * * * *